US008860960B2

(12) United States Patent
Pesar

(10) Patent No.: US 8,860,960 B2
(45) Date of Patent: Oct. 14, 2014

(54) SYSTEMS AND METHODS FOR ADDING INFORMATION TO AN N-UP PRINT

(75) Inventor: Robert J. Pesar, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1168 days.

(21) Appl. No.: 12/497,033

(22) Filed: Jul. 2, 2009

(65) Prior Publication Data

US 2011/0001997 A1   Jan. 6, 2011

(51) Int. Cl.
*G06F 15/00* (2006.01)
*G06F 3/12* (2006.01)

(52) U.S. Cl.
CPC .............. *G06F 3/1208* (2013.01); *G06F 3/125* (2013.01)
USPC ....... 358/1.13; 358/1.15; 358/1.16; 358/1.17; 358/1.18

(58) Field of Classification Search
USPC ...................... 358/1.13, 1.15, 1.16, 1.17, 1.18
See application file for complete search history.

(56) References Cited

U.S. PATENT DOCUMENTS

| 7,177,045 | B2 * | 2/2007 | Goel et al. | 358/1.18 |
| 7,471,401 | B2 * | 12/2008 | Saito | 358/1.13 |
| 8,184,343 | B2 * | 5/2012 | Tani et al. | 358/3.28 |
| 2002/0101599 | A1 * | 8/2002 | Okimoto et al. | 358/1.13 |
| 2003/0202213 | A1 * | 10/2003 | Saito | 358/1.18 |
| 2006/0082820 | A1 * | 4/2006 | Anderson et al. | 358/1.15 |
| 2006/0217954 | A1 * | 9/2006 | Koyama et al. | 704/2 |
| 2007/0253020 | A1 * | 11/2007 | Hull et al. | 358/1.15 |
| 2008/0104408 | A1 * | 5/2008 | Mayer | 713/178 |

* cited by examiner

*Primary Examiner* — Steven Kau
*Assistant Examiner* — Mark Milia
(74) *Attorney, Agent, or Firm* — MH2 Technology Law Group LLP

(57) ABSTRACT

Systems and methods of adding information to an N-Up output document. The systems and methods include a user interface of a printer driver that can prompt a user to enter information about an accessed original document to be printed as N-Up. The entered information relates to specific page images, N-Up pages, as well as to the N-Up document itself. A printer can print an N-Up output document with both the page images and the associated entered information. The entered information is displayed either in proximity to the respective components, or in a list which provides a reference for a viewer.

20 Claims, 5 Drawing Sheets

SYSTEMS AND METHODS FOR ADDING INFORMATION TO AN N-UP PRINT

FIELD OF THE INVENTION

The present embodiments relate to the field of printing and printer drivers, and more particularly to systems and methods for adding information to an N-Up document.

BACKGROUND OF THE INVENTION

The use of printer drivers that serve as a gateway between an application and a printing device is well established. With a print driver, an application such as a word processor does not need to be aware of the technical details of the printer from which the user desires to print a document. When a user chooses to print a document, a relevant print driver user interface can display on a display device, allowing the user to select options relating to the print job such as, for example, duel-side printing, stapling, punching, sort/stack, paper size, number of copies, output tray, and the like.

A further option offered by some existing printer drivers is N-Up printing, which allows a user to condense a multiple page document into a smaller number of printed pages. To accomplish this, the size of the pages of the document is reduced such that multiple page images are printed on a single sheet. A user can specify a number for "N" to be the number of page images per sheet, which is usually a value between 2 and 16. One benefit of N-Up printing is to reduce the amount of used paper. For example, the amount of paper is reduced 50% with 2-Up printing, and 75% with 4-Up printing. N-Up printing can be particularly useful for producing handouts and presentation notes.

However, a drawback of N-Up printing is that, because of the reduced size of the page images, an N-Up document can be difficult to read. This can be particularly the case if the page images contain small text or image details, or if a high value is specified for N. If an N-Up document is difficult to read, then a viewer of the document may not be able to decipher the document or even know the subject matter to which the document refers. Further, the viewer may not be able to gauge which page of the original document to navigate to based on a glance of the N-Up document.

A need, therefore, exists for systems and methods to add functionality to the N-Up printing feature. Specifically, a need exists for systems and methods to help a user decipher the contents of an N-Up document.

SUMMARY OF THE EMBODIMENTS

The following presents a simplified summary in order to provide a basic understanding of some aspects of one or more embodiments. This summary is not an extensive overview, nor is it intended to identify key or critical elements of the embodiments nor to delineate the scope of the embodiments. Rather, its primary purpose is merely to present one or more concepts in simplified form as a prelude to the detailed description presented later.

In accordance with the present teachings, a method of adding information to an N-Up output document is provided. The method comprises detecting a selection for one or more pages of the N-Up output document and one or more images of the one or more selected pages, receiving an image description for each of the one or more selected images; and appending, to the N-Up output document, the corresponding image description for each of the one or more selected images.

In accordance with the present teachings, a system for adding information to an N-Up output document is provided. The system comprises a printer driver configured to detect a selection for one or more pages of the N-Up output document and one or more images of the one or more selected pages, receive an image description for each of the one or more selected images; and append, to the N-Up output document, the corresponding image description for each of the one or more selected images.

BRIEF DESCRIPTION OF THE DRAWINGS

The accompanying drawings, which are incorporated in and constitute a part of this specification, illustrate embodiments and together with the description, serve to explain the principles of the embodiments. In the figures.

Figure 1:
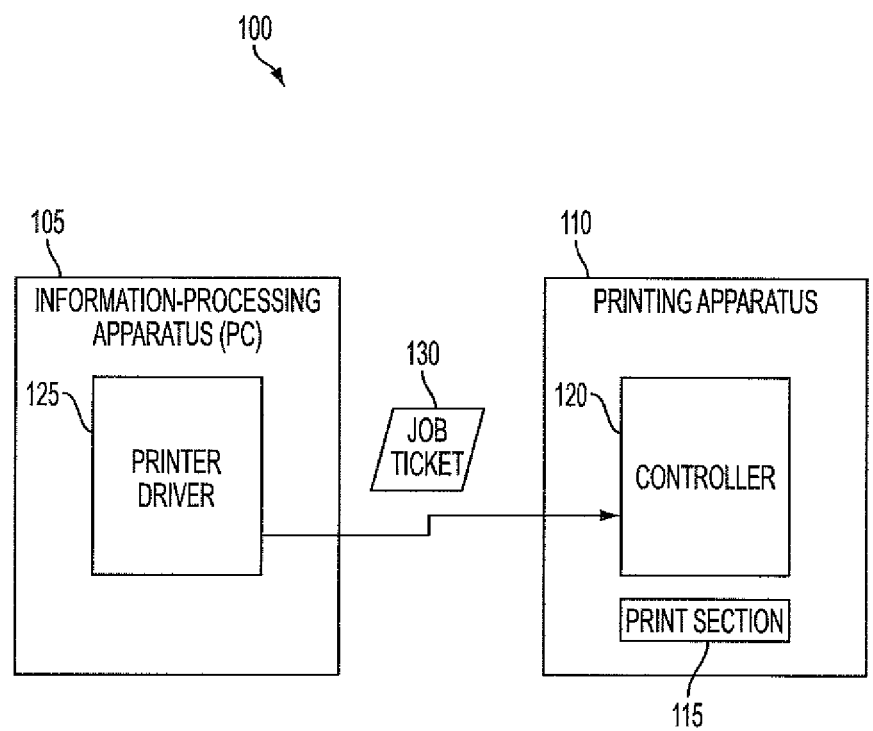
FIG. 1 depicts an exemplary block diagram showing a structure of a printing system according to the present teachings.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present and exemplary embodiments, examples of which are illustrated in the accompanying drawings. Wherever possible, the same reference numbers will be used throughout the drawings to refer to the same or like parts.

Various embodiments provide systems and methods that allow a user to add textual information to an N-Up document. Options relating to the functionality of the N-Up printing feature can be selected via a user interface of a printer driver, as known in the art. In particular, a printer driver user interface dialogue can allow a user to add information to each page image on a multi-image printed page, to each printed page, and to an entire N-Up document.

As described herein, an original document can refer to the document sent to a printer driver for printing; an original page can refer to a page of the original document as it appears before N-Up printing; an N-Up output document can refer to the original document after processed as N-Up; an N-Up page can refer to a sheet of the N-Up output document comprising reduced-size images of one or more original pages; and an image or a page image can refer to a reduced-size version of an original page as it appears on the N-Up page.

N-Up printing, as it is known in the art, refers to the ability to print multiple original pages on a single N-Up page. A user can specify a number for "N" to be the number of original pages per N-Up page, which is usually a value between 2 and 16. A print driver can reduce the size of the original pages such that page images of the original pages can fit on an N-Up page, according to the selected "N" value. For example, if a user chooses to print an original document with 18 original pages as 9-Up, then the print driver can create an N-Up output document comprising 2 N-Up pages with 9 page images per page. The page images can be reduced in size accordingly to fit on the N-Up pages.

In the present embodiments, a user can be given the option to add a description or other textual information about any or all of the page images, the N-Up pages, or the N-Up output document. The descriptions can function to give a viewer of the N-Up output document a brief summary or snapshot of the page images, N-Up pages, and/or N-Up output document. In particular, for example, if one or more images of an N-Up page are difficult to read, the description(s) can provide a relevant summary to what the images refer. Further, the viewer can use the description(s) to quickly locate or reference a corresponding original page in the original document.

The printer driver can format the N-Up output document to include the added descriptions when printed. In embodiments, if there isn't enough room for both the descriptions and the page images as originally specified by the selection of "N," then the printer driver can reformat the N-up pages with more white space by reducing the number of page images per N-Up page. For example, if a 9-Up page does not have enough space for 9 page images and associated descriptions, then the printer driver can format the 9-Up output document to comprise 6 images per 9-Up page, with the extra 3 images being moved to the next 9-Up page in a cascading manner. Similar formatting can be made to the rest of the N-Up output document.

In embodiments, the added description of, for example, the N-Up output document can, in addition to describing the N-Up output document, comprise a reference to the original document. For example, the N-Up output document description can indicate a location where the original document is stored.

Referring to FIG. 1, depicted is an exemplary block diagram showing a structure of a printing system 100 according to the present embodiments. The printing system 100 can be configured for the direct printing of a document, image, or other file received as a job ticket and capable of being printed.

As shown in FIG. 1, the printing system 100 can comprise an information-processing apparatus (PC) 105 and a printing apparatus 110, which can be connected to each other locally or via a network such as a local area network (LAN). The PC 105 can be operable by a user and can be a client apparatus for transmitting a print request to the printing apparatus 110. The PC 105 can be comprised of conventional components such as, for example, an operating system, printer drivers, utility applications and programs, a CPU, a main memory, ROM, an external memory device such as a hard disk, an input device such as a keyboard or a mouse, an output device such as a liquid crystal display, and the like.

The printing apparatus 110 can be a printer for performing print processing in accordance with a print request from the PC 105. As shown in FIG. 1, the printing apparatus 110 can include a print section 115 and a controller 120. The print section 115 can be an image output terminal (IOT) that can be capable of printing an image on a recording medium by means of a suitable printing system such as an electrophotographic system. The controller 120 can control the printing apparatus 110 via included components such as a CPU, ROM, main memory, and the like.

The PC 105 can comprise a printer driver 125 that can receive a print request for a document from a user. For example, the user can open a document in an application and submit a print request for the document through the application. The printer driver 125 can query the user for print settings relating to the print request. For example, the print settings can comprise settings related for dual-side printing, N-Up, staple, punch, color, sort/stack, paper size, number of copies, printing device, and the like.

Once the user sets desired settings for the print request and confirms the settings, the printer driver 125 can create a job ticket 130 which can comprise the data and settings necessary for the printing apparatus 110 to complete the requested print job. The printer driver 125 can send the job ticket 130 to the controller 120 of the printing apparatus 110. The controller 120 can receive and process the job ticket 130 and the print section 115 can complete the print request according to the job ticket 130 by printing an output document.

FIGS. 2A-2D depict exemplary screen shots of an exemplary printer driver interface. It should be appreciated that the screen shots are merely exemplary and can be accessed and displayed in any form or layout. A user can access the printer driver interface by, for example, choosing a page setup or print function for a corresponding currently-accessed original document, file, and the like, within a program or application.

Figure 2A:
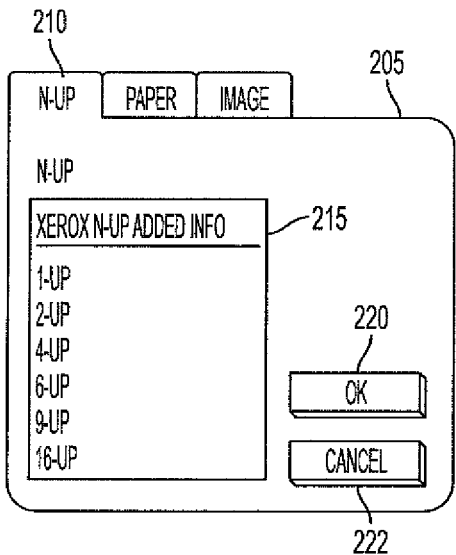
FIGS. 2A-2D depict exemplary user interfaces of a printer driver according to present teachings.

FIG. 2A depicts an exemplary N-Up option window 205 as selectable by an N-Up tab 210. The N-Up option window 205 can comprise a selection box 215 with corresponding N-Up options. For example, as shown in FIG. 2A, a user can choose to print a document 1-Up (normal size) to 16-Up (16 images per N-Up page), as well as intermediary values. The user can select the desired N-Up value from the selection box 215 and confirm the selection by selecting an OK button 220. The N-Up option window 205 can further comprise a cancel button 222 which, upon selection, can close the N-Up option window 205.

Figure 2B:
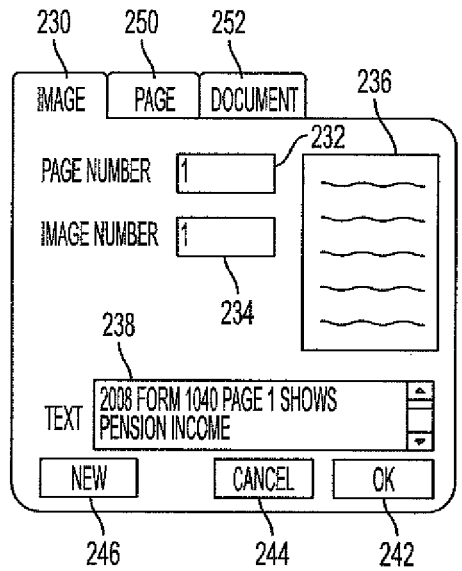

FIG. 2B depicts an exemplary image tab 230 of an N-Up information box, which can pop up upon a user selecting the OK button 220 of FIG. 2A. The image tab 230 can allow the user to enter a text description about a desired image of a currently-accessed original document. The image tab 230 can comprise a page number box 232 and an image number box 234, in which the user can enter the desired N-Up page number and associated page image number (of the desired N-Up page) of the document, respectively, to be printed as N-Up. For example, if the original document has 18 pages, the user wants to enter a description for the 5th original page, and the user has selected to print the document as 9-Up, then the user enters "1" into the page number box 232 and "5" into the image number box 234, as this combination corresponds to the 5th original page of the original document. For further example, if the original document has 18 pages, the user wants to enter a description for the 12th original page, and the user has selected to print the document as 9-Up, then the user enters "2" into the page number box 232 and "3" into the image number box 234, as this combination corresponds to the 12th page of the original document.

Once the user enters values into the page number box 232 and the image number box 234, a snapshot image 236 of the corresponding original page can be displayed. In embodiments, the snapshot image 236 can be an actual image or a representation of the corresponding original page. The user can enter a text description of the snapshot image 236 into a text box 238. For example, as shown in FIG. 2B, the description reads "2008 Form 1040 Page 1 Shows Pension Income." In embodiments, the text box 238 can allow for a limited number of characters to be input so as to limit the size of the corresponding area of the displayed text on the N-Up output document.

The image tab 230 can further comprise an OK button 242, a cancel button 244, and a new button 246. Upon selection of the OK button 242, the corresponding program can attach the description in text box 238 to the corresponding page image as indicated boxes 232 and 234, and return to a print option or document program, or navigate to other tabs, such as a page tab 250 or a document tab 252. Upon selection of the cancel button 244, the corresponding program can exit the image tab 230 functionality without saving or attaching any entered text, and return to a print option or document program. Upon selection of the new button 246, the corresponding program can attach the description in text box 238 to the corresponding page image as indicated in boxes 232 and 234, re-display the image tab 230 with blank fields in boxes 232, 234, and 238, and allow the user to enter in new values and descriptions for desired page images. In embodiments, upon selection of the new button 246, the corresponding program can pre-fill input boxes 232 and 234 with the next sequential page image in relation to the previously-entered page image.

Figure 2C:
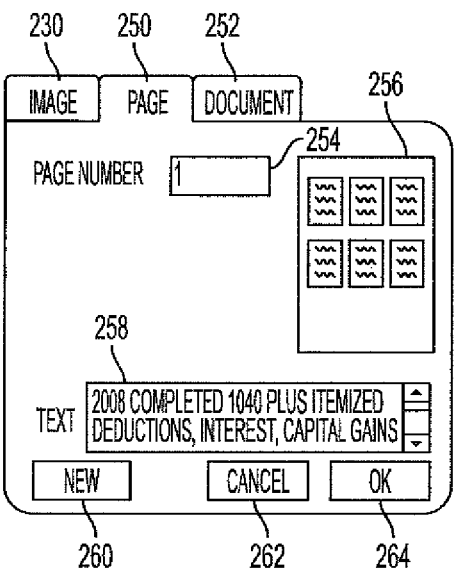

The page tab 250 and the document tab 252 of the N-Up information box can be visible and selectable when the image tab 230 is selected. FIG. 2C is an exemplary depiction of the page tab 250, which can focus and display upon a user selection. The page tab 250 can allow the user to enter a text description about a desired N-Up page and corresponding page images of a currently-accessed document. The page tab 250 can comprise a page number box 254 in which the user can enter the desired N-Up page number. For example, if the original document has 18 original pages, the user wants to enter a description for the 2nd N-Up page depicting the 10th-18th original pages of the document, then the user enters "2" into the page number box 254.

Once the user enters a value into the page number box 254, an N-Up page image 256 of the corresponding N-Up page can be displayed. In embodiments, the N-Up page image 256 can be an actual image depicting the original pages in the corresponding N-Up page, or a representation of the original pages in the corresponding N-Up page. The user can enter a text description of the N-Up page image 256 into a text box 258. For example, as shown in FIG. 2C, the description reads "2008 Completed 1040 plus itemized deductions, Interest, Capital Gains." In embodiments, the text box 258 can allow for a limited number of characters to be input so as to limit the size of the corresponding area of the displayed text on the N-Up output document.

The page tab 250 can further comprise an OK button 264, a cancel button 262, and a new button 260. Upon selection of the OK button 264, the corresponding program can attach the description in text box 258 to the corresponding N-Up page as indicated in box 254, and return to a print option or document program, or navigate to other tabs such as the image tab 230 or the document tab 252. Upon selection of the cancel button 262, the corresponding program can exit the page tab 250 functionality without saving or attaching any entered text, and return to a print option or document program. Upon selection of the new button 260, the corresponding program can attach the description in text box 258 to the corresponding N-Up page as indicated in box 254, re-display the page tab 250 with a blank field in box 254, and allow the user to enter in new values and descriptions for desired N-Up pages. In embodiments, upon selection of the new button 260, the corresponding program can pre-fill input box 254 with the next sequential N-Up page in relation to the previously-entered N-Up page.

Figure 2D:
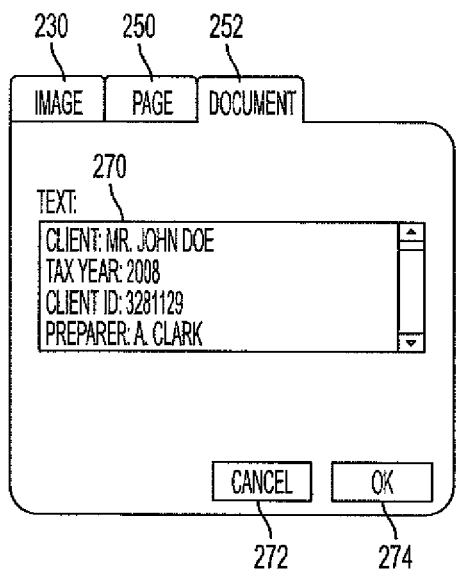

FIG. 2D is an exemplary depiction of the document tab 252, which can focus and display upon a user selection. The document tab 252 can allow the user to enter a text description about the currently-accessed document to be printed N-Up within the program or application. The document tab 252 can comprise a text box 270, in which the user can enter a text description of the N-Up document. In embodiments, the text box 270 can allow for a limited number of characters to be input so as to limit the size of the corresponding area of the displayed text. In embodiments, the document tab 252 can display a preview image of how the N-Up document will look when printed.

The document tab 252 can further comprise an OK button 274 and a cancel button 272. Upon selection of the OK button 274, the corresponding program can attach the description in text box 270 to the N-Up output document, and return to a print option or document program, or navigate to a tab such as the image tab 230 or the page tab 250. Upon selection of the cancel button 272, the corresponding program can exit the document tab 252 functionality without saving or attaching any entered text, and return to a print option or document program. In embodiments, a print button (not shown in figures) can be accessed to directly print the N-Up output document.

Figure 3:
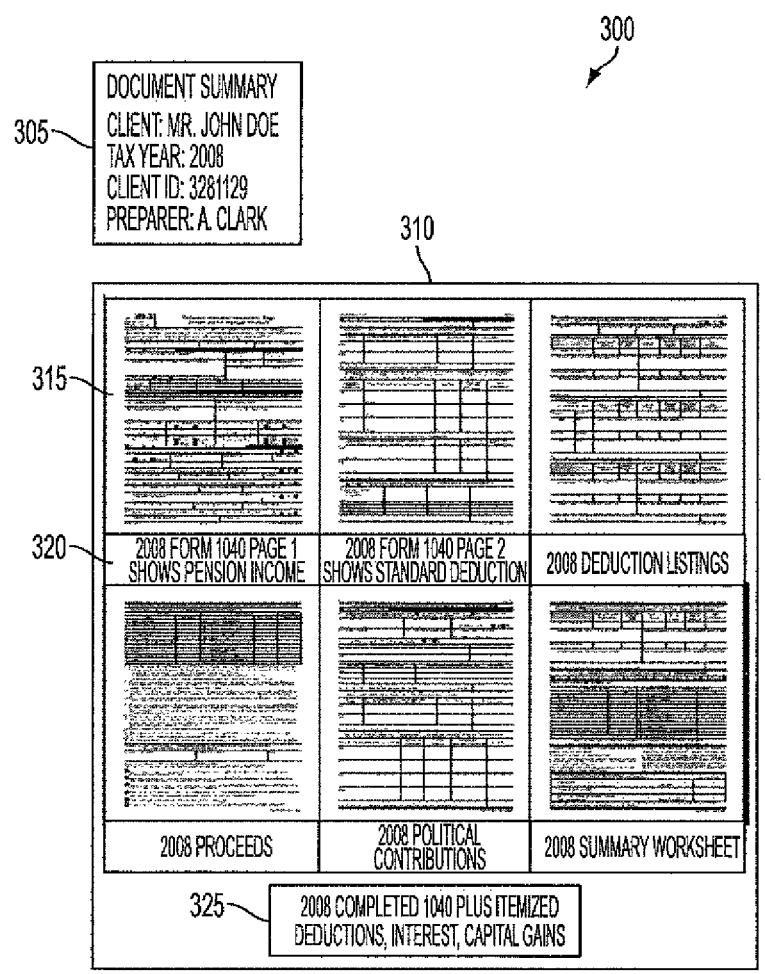
FIG. 3 depicts an exemplary N-Up output document according to the present teachings.

Referring to FIG. 3, depicted is an exemplary N-Up output document 300 according to the present embodiments. The N-Up output document 300 can comprise a document summary window 305 and an N-Up page 310. It should be appreciated that there can be multiple N-Up pages 310 for a single document summary window 305. In preferred embodiments, the document summary window 305 can be on an output sheet, such as a cover sheet, separate from the N-Up page 310 so as to reduce formatting issues. However, it should be appreciated that the document summary window 305 and the N-Up page 310 can be arranged on the same output sheet in any way. For illustrative purposes, the document summary window 305 and the N-Up page 310 appear together in FIG. 3.

The document summary window 305 can comprise a document summary comprising a description of the N-Up document as entered by the user and described herein, in particular with respect to FIG. 2D. The N-Up page 310 can comprise one or more page images 315 as conventionally displayed on an outputted N-Up page, as described herein. Each of the page images 315 on the N-Up page 310 can have a corresponding image description 320 as entered by the user and described herein, in particular with respect to FIG. 2B. For example, the page image 315 located in the top left corner of the N-Up page 310 has a corresponding image description 320 of "2008 Form 1040 Page 1 Shows Pension Income." In embodiments, the image description 320 can be located below the respective page images 315, as shown in FIG. 3, although it should be appreciated that other arrangements and locations can be utilized.

The N-Up page 310 can further comprise an N-Up page description 325 as entered by the user and described herein, in particular with respect to FIG. 2C. For example, the N-Up page 310 has a corresponding N-Up page description 325 of "2008 Completed 1040 plus itemized deductions, Interest, Capital Gains." In embodiments, the page description 325 can be located near the bottom of the N-Up page 310, as shown in FIG. 3, although it should be appreciated that other arrangements and locations can be utilized.

In embodiments, if there isn't enough room on the N-Up page 310 for both the descriptions and the page images as originally specified by the selection of "N," then the printer driver can reformat the N-up page 310 with more white space by reducing the number of page images 315 per N-Up page 310. For example, if a 9-Up page does not have enough space for 9 page images and associated descriptions, then the printer driver can format the 9-Up output document to comprise 6 images per 9-Up page, with the extra 3 images being moved to the next 9-Up page in a cascading manner. Similar formatting can be made to the rest of the N-Up pages in the N-Up output document.

Figure 4:
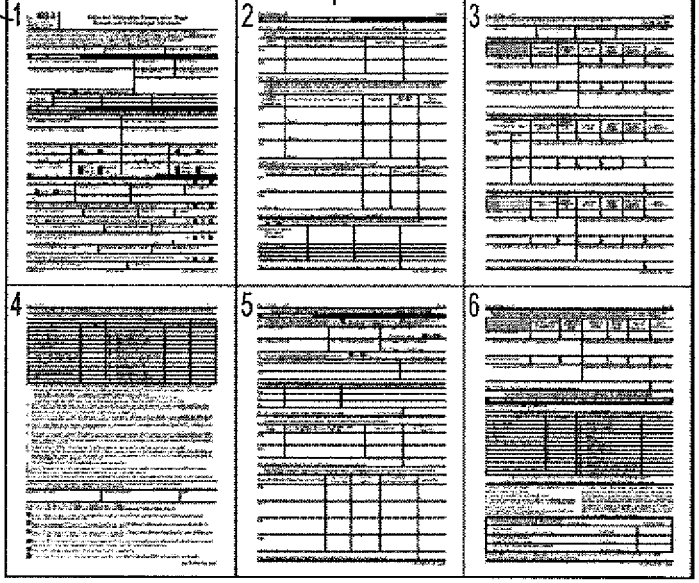
FIG. 4 depicts an exemplary N-Up output document according to the present teachings.

FIG. 4 depicts an exemplary N-Up output document 400 according to the present embodiments. The N-Up output document 400 can comprise a summary window 405 and a page image array 415. In preferred embodiments, the summary window 405 is on an output sheet, such as a cover sheet, separate from the page image array 415 so as to reduce formatting issues. However, it should be appreciated that the summary window 405 and the page image array 415 can be arranged on the same output sheet in any way. For illustrative purposes, the summary window 405 and the page image array 415 appear together in FIG. 4.

The summary window 405 can comprise a document summary section 406, an N-Up page summary 408, and a page image list 410. The document summary section 406 can comprise a description of the N-Up document as entered by the user and described herein, in particular with respect to FIG. 2D. The N-Up page summary 408 can comprise a description of one or more of the N-Up pages of the N-Up document as entered by the user and described herein, in particular with respect to FIG. 2C. In embodiments, the N-Up page summary 408 can indicate which N-Up page to which the description corresponds. For example, as shown in FIG. 4, the N-Up page summary 408 indicates a description for "Page 1." In embodiments, the N-Up page summary 408 can comprise a listing of each N-Up page of the N-Up document as well as each corresponding description.

The page image list 410 can comprise a description of one or more of the page images of the N-Up document as entered by the user and described herein, in particular with respect to FIG. 2B. The page image list 410 can comprise an indicator for each corresponding page image description. For example, as shown in FIG. 4, indicators 1-6 are displayed in the left column and which match up with the corresponding page image descriptions displayed in the right column. In embodiments, an N-Up page number can be indicated in the page image list 410 such that image indicators can be reused. For example, the page image list 410 can list an entry as "Page #2, Image #4."

The page image array 415 can comprise page images as displayed on an outputted N-Up page, as described herein. Each of the page images in the page image array 415 can have a corresponding image indicator 416 that can have a corresponding indicator in the page image list 410. For example, as shown in FIG. 4, page image "1" as referenced by 416 and displayed in the page image array 415 has a corresponding description "2008 Form 1040 Page 1 Shows Pension Income," as indicated by the matched-up "1" indicator in the page image list 410. In embodiments, the image indicator 416 can be assigned by the printer driver, and can be added in a margin area of the appropriate page image in the page image array 15. Further, the image indicator 416 can be applied like a watermark on the N-Up output document. The image indicator 416 can allow a user to look up a description of any or all of the page images referenced in the paged image array 415.

Figure 5:
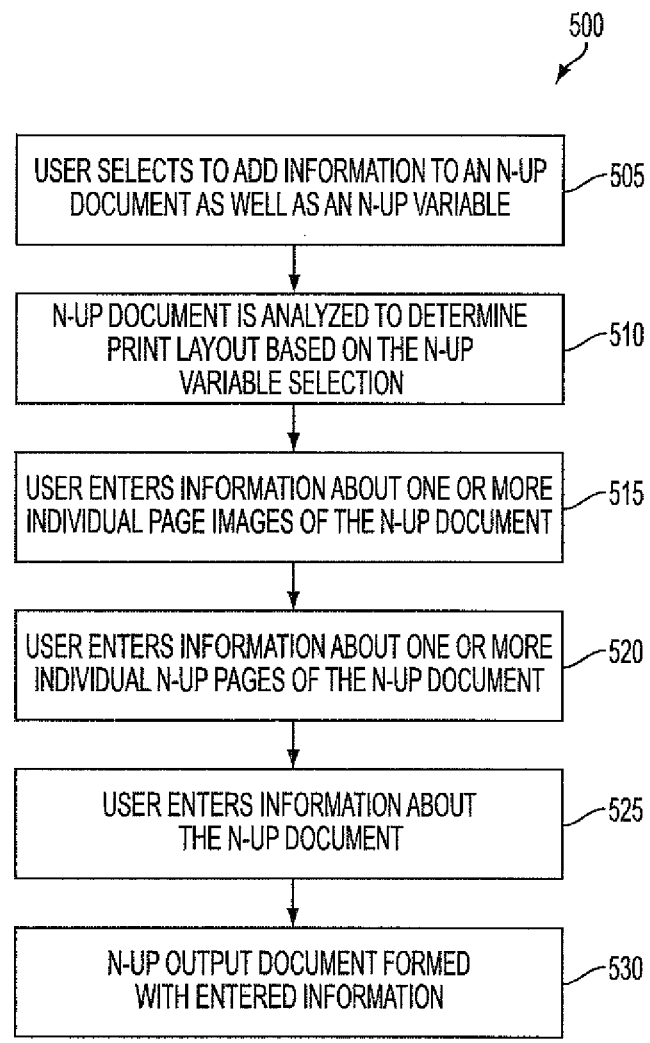
FIG. 5 depicts an exemplary flow diagram of adding textual information to an N-Up document according to the present teachings.

Referring to FIG. 5, a present embodiment for an exemplary method 500 for adding information to an N-Up output document is depicted. It should be appreciated that the mechanical and electronic components of a PC and/or imaging device can perform the steps of the method 500.

In 505, a user can select to add information to an N-Up document as well as select an N-Up variable. In embodiments, the user can select the function from a user interface of a printer driver, for example as described with respect to FIG. 2A. In 510, the N-Up document is analyzed to determine the print layout of the document based on the N-Up variable selection. For example, the printer driver can determine the number of N-Up pages and the number of page images that will appear on each N-Up page. In 515, the user can enter information about one or more individual page images of the N-Up document. In embodiments, the user can specify an N-Up page number and a reference to the individual page image on the specified N-Up page. Further, the user interface can display an actual image of the corresponding specified original page as a reference for the user.

In 520, the user can enter information about one or more individual N-Up pages of the N-Up document. In embodiments, the user can specify an N-Up page number about which to enter information. Further, the user interface can display an actual image of the specified N-Up page, complete with corresponding page images, as a reference for the user. In 525, the user can enter information about the N-Up document. In embodiments, the information can be a summary of the N-Up document that can be used as a reference for the user.

In 530, the entered information of the page images, N-Up pages, and N-Up document can be formed into an N-Up output document. In embodiments, the N-Up document information can appear as a separate cover sheet to the rest of the N-Up output document. Further, in embodiments, the page image information and N-Up page information can appear on the same output sheet as the actual page images. Still further, in embodiments, the page image information and N-Up page information can appear with the N-Up document information on the cover sheet, where page image and N-Up page indicators can reference corresponding page images and N-Up pages in the N-Up output document.

While the embodiments have been illustrated with respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method of adding information to an N-Up output document, comprising:

receiving an N-Up value from a user;
generating the N-Up output document based on the N-Up value;
receiving a selected page value from the user;
displaying a selected page of the N-Up output document corresponding to the selected page value;
receiving a page description from the user in response to displaying the selected page;
receiving a second selected page value and a selected image value from the user;
displaying a selected image, wherein:
- the selected image corresponds to the selected image value and to a second selected page of the N-Up output document; and
- the second selected page corresponds to the second selected page value;

receiving an image description from the user in response to displaying the selected image; and
appending, to the N-Up output document, the page description and the image description, using one or more processors, wherein appending the page description and the image description comprises reformatting the N-Up output document whereby:
- at least one page has an image moved from the page to a subsequent page of the N-Up output document;
- a number of images associated with the page is reduced from the N-Up value from the user to a number less than the N-Up value from the user; and
- a number of images associated with the subsequent page is equal to the N-Up value.

2. The method of claim 1, further comprising:
receiving a document description for the N-Up output document; and
appending the document description to the N-Up output document.

3. The method of claim 2, wherein the document description is appended to a cover sheet of the N-Up output document.

4. The method of claim 1, wherein the image description is appended adjacent to the selected image.

5. The method of claim 1, further comprising:
adding an indicator to the selected image, wherein the indicator is referenced in a list comprising the page description and the image description.

6. The method of claim 5, wherein the list is appended to a cover sheet of the N-Up output document.

7. The method of claim 2, further comprising:
formatting the N-Up output document to accommodate the appending of the document description.

8. The method of claim 1, further comprising:
sending the N-Up output document to a printer.

9. The method of claim 1, wherein values are received from the user via a user interface of a printer driver.

10. A system for adding information to an N-Up output document, comprising:
a printer driver configured to communicate with a processing system comprising one or more processors; and
a memory system comprising one or more computer-readable non-transitory media, wherein the one or more computer-readable non-transitory media contain instructions stored thereon that, if executed by the processing system, cause the processing system to perform operations comprising:
receiving an N-Up value from a user;
generating the N-Up output document based on the N-Up value;
receiving a selected page value from the user;
displaying a selected page of the N-Up output document corresponding to the selected page value;
receiving a page description from the user in response to displaying the selected page;
receiving a second selected page value and a selected image value from the user;
displaying a selected image, wherein:
- the selected image corresponds to the selected image value and to a second selected page of the N-Up output document; and
- the second selected page corresponds to the second selected page value;

receiving an image description from the user in response to displaying the selected image; and
appending, to the N-Up output document, the page description and the image description, wherein appending the page description and the image description comprises reformatting the N-Up output document whereby:
- at least one page has an image moved from the page to a subsequent page of the N-Up output document;
- a number of images associated with the page is reduced from the N-Up value from the user to a number less than the N-Up value from the user; and
- a number of images associated with the subsequent page is equal to the N-Up value.

11. The method of claim 1, wherein an amount of text for the page description and an amount of text for the image description are limited based on a format of the N-Up output document that was generated.

12. The system of claim 10, the operations further comprising:
receiving a document description for the N-Up output document; and
appending the document description to the N-Up output document.

13. The system of claim 12, wherein the document description is appended to a cover sheet of the N-Up output document.

14. The system of claim 10, wherein the image description is appended adjacent to the selected image.

15. The system of claim 10, the operations further comprising:
adding an indicator to the selected image, wherein the indicator is referenced in a list comprising the page description and the image description.

16. The system of claim 15, wherein the list is appended to a cover sheet of the N-Up output document.

17. The system of claim 12, the operations further comprising:
formatting the N-Up output document to accommodate the appending of the document description.

18. The system of claim 10, the operations further comprising:
sending the N-Up output document to a printer.

19. The system of claim 10, wherein values are received from a user interface of the printer driver.

20. The system of claim 10, wherein an amount of text for the page description and an amount of text for the image description are limited based on a format of the N-Up output document that was generated.

* * * * *